July 12, 1960  W. BRAATZ  2,944,448
CAM OPERATED FORGING MACHINE
Filed July 30, 1952  2 Sheets-Sheet 1
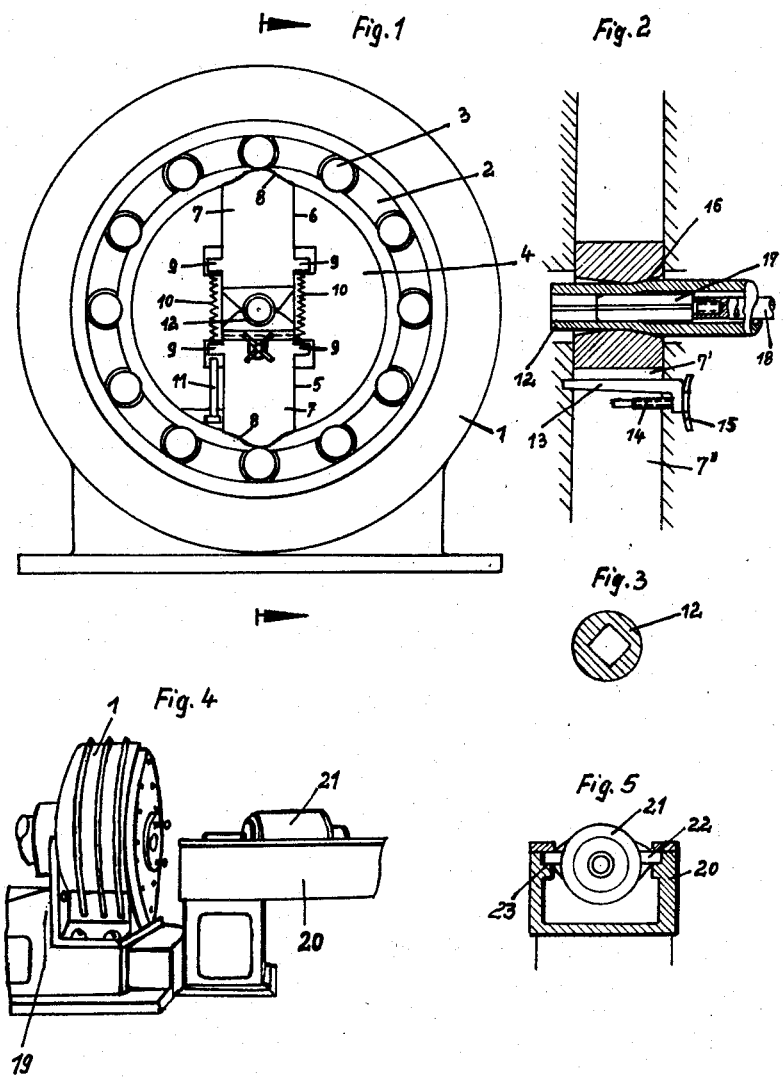
Inventor:
Willi Braatz

United States Patent Office 2,944,448
Patented July 12, 1960

2,944,448
CAM OPERATED FORGING MACHINE

Willi Braatz, Berlin-Spandau, Germany, assignor to Canadian Ingersoll-Rand Company, Ltd., Montreal, Quebec, Canada, a corporation of Canada Filed July 30, 1952, Ser. No. 301,772

Claims priority, application Germany Jan. 24, 1952

1 Claim. (Cl. 78—21)

A cold forging process is known in which a workpiece is radially pressed or hammered over its periphery by at least two opposed tools conforming to the desired shape, the pressing or hammering being continued in sections longitudinally of the workpiece. The deformation carried out in stretching machines effects a thinning and stretching of the workpiece and thus good longitudinal grain formation and consolidation.

According to the present invention, the process aforesaid is employed for the internal shaping of hollow members, more especially tubular members, resulting in the advantage that it is possible not only to achieve a longitudinal stretching and a longitudinal grain formation on the workpiece, but also a thickening of the tube wall according to the nature of the simultaneous internal treatment of the workpiece or the discontinuance thereof. The thickening of the tube wall can also be restricted at will to a predetermined length of the workpiece, and it is also possible for the inside wall at predetermined positions of the workpiece to be particularly compressed by mechanical treatment or the said wall can be given a predetermined cross-sectional form, for example, a rectangular or hexagonal cross-section.

An advantageous arrangement is provided when the workpiece is pressed when in a condition below the annealing temperature and with the avoidance of any hammering. By this means, the material has sufficient time to flow and its structure is better maintained. Moreover, the pressing operation results in smaller vibrations being given to the pressing apparatus. It is known to force a heating or pressing tool gently against a workpiece, that is to say, to press gently during the primary pressing, but not to prevent bouncing of the tool during the return stroke, such bouncing leading to secondary beating actions. Such secondary beating or hammering actions can only be prevented by a positive return of the tool, or by returning it under very strong spring action.

With advantage, the workpiece can be electrically heated indirectly during treatment; for example, iron can be heated to about 400°–500°. This facilitates large deformations of the workpiece, and the surfaces are nevertheless given a high polish and the material is hardened or consolidated throughout its cross-section.

A second workpiece can also be introduced into the hollow workpiece and the latter then be firmly pressed on to the former in sections. In this manner, for example, wire cables or bars can be provided with sleeve-like end elements.

An advantageous stretching machine for carrying the process into effect is obtained if a shaping mandrel is provided adapted to be displaceably introduced into the workpiece and, if required, rotated by positive means, resilient means or manually. By this means, it is possible for the workpiece to be formed with smooth, round, angular, helical or other internal shape.

A further advantageous embodiment of a stretching machine having at least two rotating press rams which are oppositely disposed and positively moved against a workpiece arranged between them and which have operative faces formed to give the desired shape to the workpiece, is obtained when the press rams are moved away from the workpiece by a spring force sufficient to overcome the mass forces directed towards the workpiece, as well as by centrifugal force. By this means, a spring or bounce back of the rams during the return stroke, and thus a hammering of the rear contact surface of the ram and a repeated hammering of the workpiece is prevented, resulting in a satisfactory flow of the material and a reduction of machine vibrations.

The support holding the workpiece is with particular advantage guided on both sides in a plane containing the axis of the workpiece, so that the workpiece does not undergo any bending stress, as might arise due to a support rocking during deformation and return strokes of the rams.

A further advantageous embodiment is obtained if the head of the rams is of sinusoidal form increased by about a hundredth part of the length of the head with respect to its ends and the return stroke of the rams is limited in such manner that the head runs gradually and tangentially on to the beater roller. This has the advantage that the machine operated very silently and only slight wear, due to the elimination of shocks, takes place, and at the same time deformation of the workpiece with each stroke of the ram is so small that no fracture of the fibres of the material of the workpiece can occur with the deformation. The return stroke can thus be limited by abutment of the head of the rams on the cage holding a ring of beater rollers, or by abutment of the rams on their slide tracks or in any other manner.

The heads of the rams are, with particular advantage, widened substantially towards the sides mushroom-fashion, so that the head is particularly long and thus presents particularly small crests. As a result, the machine operates even more smoothly.

A further advantageous construction is obtained when the head of the rams is made so long that it exceeds the spacing of the points of contact of two adjacent beater rollers. This has the advantage that each head always bears on at least one beater roller and on two beater rollers during the transition from one beater roller to the next, so that the return stroke of the rams is restricted with only rolling friction by the beater rollers themselves.

All radii of curvature of the sinusoidal form of the heads of the rams are with advantage greater than the radii of curvature of the beater rollers, so that no shocks or impacts can occur during the travel of the beater rollers over the heads of the rams.

An interchangeable hardened head element is with particular advantage fitted in the head of the ram, for example, by means of a dove-tail joint, the element including the central portion of the head of the ram. By this means, that portion of the head which is most highly stressed is capable of withstanding strong stresses and is also adapted to be exchanged at low cost.

The interchangeable head element is expediently fitted in a rounded dove-tail groove, advantageously cooled before insertion, for example, by liquid air, while the head of the ram is heated for extracting the head element. This arrangement prevents the danger of the ram head being scored and the head element can readily be interchanged in spite of its rigid seating.

The forging dies are expediently secured rigidly to the rams, for example, by means of screws, clamping jaws and the like. This has the advantage that no shocks can occur, even between the rams and the dies. The setting of the dies can thus be effected by shims.

Embodiments of the invention are shown by way of example on the accompanying drawings, wherein:

Figure 1 is an end view of a stretching machine with rotating ram holder;

Figure 2 is an enlarged longitudinal section through the rams and also showing the workpiece and the shaping mandrel;

Figure 3 is a cross-section through the shaped workpiece;

Figure 4 is a side elevation to a smaller scale of the machine with a feed bench;

Figure 5 is a cross-section through the support of the feed bench;

Figure 8 is a sectional view of two tubular work pieces which are connected in accordance with the present invention.

Figure 6:
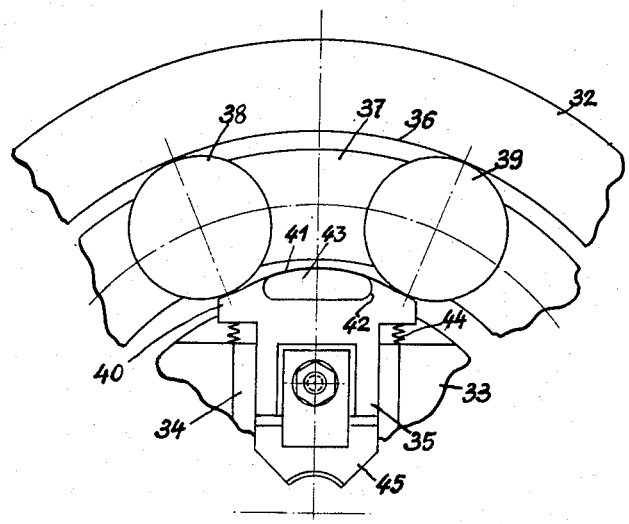
Figure 6 is a partial view of a similar machine housing, ram holder and ring of beater rollers.

Mounted in a stationary housing 1 is a non-driven cage 2 with rollers 3 which exteriorly roll in the housing 1.

A round ram holder 4 which is positively rotated includes diametrically arranged guides 5, 6 in which are slidably mounted press rams 7, the bearing surfaces 8 of the head of which are shaped similar to a complete sine wave, so that the rollers 3 engaging therewith ride, as far as possible, without shock on the end bearing surfaces 8. The rams 7 are formed with lateral projections 9 engaged by strong springs 10 which support the rams relatively to one another and force them outwardly with great force so that they are not retained inwardly by the impact forces of the rollers 3 but can spring back again and beat repeatedly.

Adjusting screws 11 are adapted to be screwed into the ram holder 4 opposite all the projections 9 in order to limit the stroke of the rams to suit the actual material of the workpiece 12 and the desired deformation and to lift the end bearing faces 8 of the rams clear of the cage 2 to such an extent that they do not rub on the latter.

The rams may be adjustable in the longitudinal direction, for example, in accordance with Figures 1 and 2. According to this arrangement, the rams 7 are divided transversely into ram sections 7' and 7'', and a wedge 13 is adapted to be inserted between the two parts, said wedge being adjustable by a screw 14 with a cross-grip 15.

The working face 16 of the ram conforms to the desired external shape of the workpiece and presents a rounded or conical entrance and outlet. A short mandrel 17 is adapted to be introduced by means of a rod 18 into the workpiece 12, said mandrel having an external shape which conforms to the desired internal shape of the workpiece, for example, rectangular.

Referring now to Figure 4, the housing 1 is supported against tilting rearwardly against the drive by a raised bedplate housing 19 which extends up to the height of the drive shaft, so that the housing cannot tilt backwardly under the operating pressure. A feed bench 20 for the workpiece includes a displaceable support 21 driven by a feed spindle and, as shown in Figure 5, includes flanges 22 on both sides of its mean axis which rest in the guides 23 forming part of the bench, so that the support 21 cannot be tilted by the return pressure of the press and thus deform the workpiece. The workpiece 12 is mounted in the support 21, while the supporting rod 18 of the mandrel 17 is led through the support 21 and secured to the bench 20, so that the mandrel 17 always remains within the range of the press rams 7, while the workpiece is slowly fed forward. The support 21 and the holding means for the rod 18 may be provided with a rotational drive if it is desired that helical deformation or the like are to be made on the workpiece.

Instead of using a rotating ram holder 4, it is possible to employ a stationary ram holder, and mount the rollers 3 in a rotating cage provided with drive means, or the housing 1 could be rotated to drive the roller cage 3. In such an arrangement, no centrifugal forces would arise to act on the rams 7, and the rollers would run up onto the end bearing faces of the rams with a reduced pressure, whereby the rams would not so easily be caused to start jumping. The return springs 10 in certain circumstances could then be dispensed with since the workpiece 12 is initially made somewhat non-circular by the pressing and being rotated, always forces back the rams 7.

Figure 7:
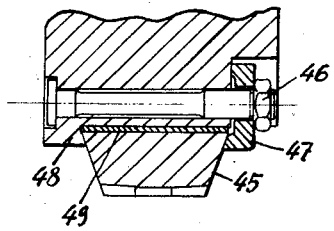
Figure 7 is a partial longitudinal section of a ram holder and an associated die.

Referring now to Figures 6 and 7, in this arrangement a housing 32 has mounted therein a rotatably driven ram holder 33 carrying rams 35 slidably mounted in radial guides 34. Rollers 38, 39 of a ring of beater rollers bedded in a cage 37 revolve freely in a track 36. Alternatively, the ring of beater rollers can be driven and the ram holders left free; it is also possible for both to be positively driven.

The head 40 of the ram 35 is widened in substantially mushroom form towards the sides in such manner that its sinusoidal bearing face 41 is somewhat longer than the spacing of the points of contact of two adjacent rollers as 38, 39 with the bearing face and the latter is so fashioned that the rollers 38, 39 always run tangentially on to the bearing face 41 of the ram. The radii of curvature of the bearing face 41 are at all points greater than the radii of curvature of the rollers 38, 39. The return stroke of the ram is thus limited by the rollers 38, 39 in such manner that the rollers always run gently on to the bearing face 41 and it is not possible for shocks to occur as the rollers run thereover.

Hardened head elements 43 are interchangeably fitted in the heads 40 of the rams by means of a rounded dovetail groove 42, said elements 43 including the middle part of the bearing face 41. By this means, that portion of the bearing face which is most strongly stressed is made particularly resisting and can readily be replaced in the event of wear. The head elements 43 are shrunk into the dove-tail grooves 42, for example, by cooling them with liquid air and then inserting them, or by heating the heads of the rams and then inserting the head elements. The heads of the rams are heated for the purpose of releasing the head elements.

Springs 44 force the ram heads on to the beater rollers 38, 39, so that chattering is prevented, even when the ram holder 33 rotates slowly or not at all, as can occur, for example, when the housing track and the roller cage revolve.

Dies 45 are rigidly secured by means of screws 46 and clamping jaws 47 to the rams 35, said jaws 47 in conjunction with an undercut portion 48 of the ram 35 gripping the dies dove-tail fashion. Interchangeable packing members 49 serve for setting the dies 45 in relation to the workpiece. Chattering between the rams and the dies is also prevented by this means.

If the rams are not formed with mushroom-like heads, the return stroke of the rams can also be limited by stops between the rams 35 and the guide tracks 34 or by the ram heads bearing on the cage 37. The embodiment illustrated is, however, preferred, because it causes less wear and the limitation of the return storke is automatically adapted to the wear of the power-transmission parts.

According to Figure 8, the end of a tube 52 is hammered on the end of the tube 51 by swaging the outer tube 52 until it is pressed firmly onto the inner tube. During such operation a suitable core can be arranged in the inner tube, if its wall thickness is insufficient to resist the swaging pressure.

The process and the machine can be used, for example, for the production of box spanners, tubes with internal splining, conical tubes, tubes with throats, the connection to cables or rods of sleeves or terminal elements and the like. The hollow bodies can be given internal shoulders or even helical shapes. For this purpose, it is only necessary to employ the requisite interior tools. When forming internal shoulder and the like, the inner tools may be passed jointly with the workpiece through the pressing apparatus throughout the pressing operation and subsequently extracted from the workpiece. The machine is obviously adapted to be used for the treatment of bars and other solid sections.

If strong deformations of the workpiece are required continuous heating of the workpiece can be employed, for example, with iron, to 300°–500°. Such heating is achieved, for example, by electric resistance heating, induction heating, gas heating or the like. For even stronger deformations, the workpiece can be annealed between individual stages of the treatment, so that the structure of the material is not damaged. In all cases, the material undergoes a continuous consolidation and hardening by the cold pressing, and the surfaces are given a high polish so that it is not necessary to give them a finishing treatment.

What I claim is:

In a swaging machine, a housing having a cylindrical inner track, a ring of rollers, a cage for said rollers maintaining them in spaced relation and in position to roll freely on said track, a ram holder adapted to be driven to rotate concentrically with respect to said track and held against rocking motion with respect to its axis, means to feed a work piece axially and centrally of said ram holder, a plurality of rams slidably mounted in said ram holder directed radially thereof and provided at their inner ends with dies to impact said work piece, and a head on each ram to contact said rollers compressively, said heads each having a cam-like surface for contact with the rollers in length equal to at least the arc between any two adjacent rollers, a curvature at all points flatter than the roller curvature starting at the ends with a radius equal to the distance from the ram holder axis to the innermost points of the rollers, the end portions of the abutment faces providing points of initial contact with said rollers at which points tangents to said faces are perpendicular to a radius passing through those points and the center of rotation of said ram holder thence concave with respect to the rollers and convex at the center with a maximum rise of $1/100$ the length of said cam-like surface, and means to maintain each said head always in contact with at least one roller during rotation of the ram holder.

References Cited in the file of this patent

UNITED STATES PATENTS

| | | |
|---|---|---|
| 439,951 | Hendey | Nov. 4, 1890 |
| 879,631 | Gregson | Feb. 18, 1908 |
| 953,616 | Henrich | Mar. 29, 1910 |
| 987,093 | Wilson | Mar. 4, 1911 |
| 1,348,013 | Larkin | July 27, 1920 |
| 1,378,039 | Warner | Mar. 17, 1921 |
| 1,430,974 | Frick | Oct. 3, 1922 |
| 2,058,556 | Blair | Oct. 27, 1936 |
| 2,126,923 | Romanelli | Aug. 16, 1938 |
| 2,331,477 | Keema | Oct. 12, 1943 |
| 2,375,481 | Lee | May 8, 1945 |
| 2,381,559 | Root | Aug. 7, 1945 |
| 2,617,319 | Richards | Nov. 11, 1952 |